(12) United States Patent
Xie et al.

(10) Patent No.: US 10,877,213 B2
(45) Date of Patent: Dec. 29, 2020

(54) OPTICAL MODULE

(71) Applicant: Hisense Broadband Multimedia Technologies Co., Ltd., Qingdao (CN)

(72) Inventors: Yifan Xie, Qingdao (CN); Qinhao Fu, Qingdao (CN); Weiwei Liu, Qingdao (CN); Mengbo Fu, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 0 days.

(21) Appl. No.: 16/563,196

(22) Filed: Sep. 6, 2019

(65) Prior Publication Data

US 2019/0391331 A1 Dec. 26, 2019

Related U.S. Application Data

(63) Continuation of application No. PCT/CN2019/091991, filed on Jun. 20, 2019.

(30) Foreign Application Priority Data

Jun. 20, 2018 (CN) .......................... 2018 1 0636125

(51) Int. Cl.
*G02B 6/42* (2006.01)
*G02B 6/12* (2006.01)

(52) U.S. Cl.
CPC ......... *G02B 6/12019* (2013.01); *G02B 6/428* (2013.01); *G02B 6/4249* (2013.01)

(58) Field of Classification Search
CPC combination set(s) only.
See application file for complete search history.

(56) References Cited

U.S. PATENT DOCUMENTS

| 6,222,967 B1* | 4/2001 | Amano | G02B 6/30 385/49 |
| 6,361,222 B1* | 3/2002 | Kawaguchi | G02B 6/30 385/39 |
| 7,949,211 B1* | 5/2011 | Grzybowski | G02B 6/4201 385/14 |

(Continued)

FOREIGN PATENT DOCUMENTS

| CN | 2599815 | 1/2004 |
| CN | 102692684 | 9/2012 |

(Continued)

OTHER PUBLICATIONS

ISA State Intellectual Property Office of the People's Republic of China, International Search Report Issued in Application No. PCT/CN2019/091991, dated Aug. 28, 2019, WIPO, 5 pages.

(Continued)

*Primary Examiner* — Eric Wong
(74) *Attorney, Agent, or Firm* — Brinks Gilson & Lione

(57) ABSTRACT

An optical module includes a circuit board and a receiver disposed on the circuit board. The circuit board includes a groove disposed in a surface of the circuit board. The groove is recessive along a height direction of the circuit board. The receiver includes an arrayed waveguide grating. The arrayed waveguide grating is configured to receive optical signal from an optical fiber. The arrayed waveguide grating is arranged above the groove and opposite to the groove.

18 Claims, 4 Drawing Sheets

(56) References Cited

U.S. PATENT DOCUMENTS

| | | | |
|---|---|---|---|
| 2002/0001427 A1* | 1/2002 | Hashimoto | G02B 6/4246 385/14 |
| 2004/0184702 A1* | 9/2004 | Hayamizu | G02B 6/125 385/14 |
| 2010/0111478 A1 | 5/2010 | Fujiyama | |
| 2012/0241600 A1 | 9/2012 | Lee et al. | |
| 2014/0193124 A1* | 7/2014 | Bylander | G02B 6/3885 385/93 |
| 2017/0336582 A1 | 11/2017 | Luo et al. | |
| 2019/0346640 A1* | 11/2019 | Xie | G02B 6/4256 |

FOREIGN PATENT DOCUMENTS

| | | |
|---|---|---|
| CN | 105278056 | 1/2016 |
| CN | 105425351 | 3/2016 |
| CN | 105866904 | 8/2016 |
| CN | 107991743 | 5/2018 |
| CN | 108828731 | 11/2018 |

OTHER PUBLICATIONS

State Intellectual Property Office of the People's Republic of China, Office Action and Search Report Issued in Application No. 201810636125.1, dated Oct. 12, 2019, 13 pages, (Submitted with Machine Translation).

\* cited by examiner

OPTICAL MODULE

CROSS-REFERENCE TO RELATED APPLICATIONS

This application is a continuation application of International Application No. PCT/CN2019/091991 filed on Jun. 20, 2019, which claims priority to Chinese Patent Application No. 201810636125.1 filed on Jun. 20, 2018, the entire contents of which are incorporated herein by reference.

TECHNICAL FIELD

The present disclosure relates to optical communication technologies, and in particular to an optical module.

BACKGROUND

An optical module is a critical device in an optical network. The optical module includes a transmitter and a receiver. The transmitter converts an electrical signal into an optical signal and transmits the optical signal via an optical fiber. The receiver converts the received optical signal into the electrical signal. In order to isolate a signal transmitted by the transmitter from a signal transmitted by the receiver, and decrease crosstalk interference between the two signals, the receiver and the transmitter are spaced from each other on a circuit board. Therefore, a space between the receiver and the transmitter is increased, and the crosstalk interference between the signals is decreased.

Previous optical modules may have a low coupling performance of the receiver and low fixing stability of components in the receiver.

The present disclosure describes an optical module, addressing at least one or more drawbacks as discussed above.

SUMMARY

The present disclosure describes an embodiment for an optical module. The optical module includes a circuit board and a receiver disposed on the circuit board. The circuit board includes a groove disposed in a surface of the circuit board. The groove is recessive along a height direction of the circuit board. The receiver includes an arrayed waveguide grating. The arrayed waveguide grating is configured to receive optical signal from an optical fiber. The arrayed waveguide grating is arranged above the groove and opposite to the groove.

One of ordinary skill in the art would understand that the above general descriptions and subsequent detailed descriptions are merely illustrative and explanatory and will not constitute limitation to the present disclosure.

BRIEF DESCRIPTION OF THE DRAWINGS

To describe the embodiments of the present disclosure more clearly, the accompanying drawings required in the examples will be briefly introduced below. It is apparent that other drawings may also be obtained by those skilled in the art without paying creative labor.

DETAILED DESCRIPTION OF THE EMBODIMENTS

Figure 1A:
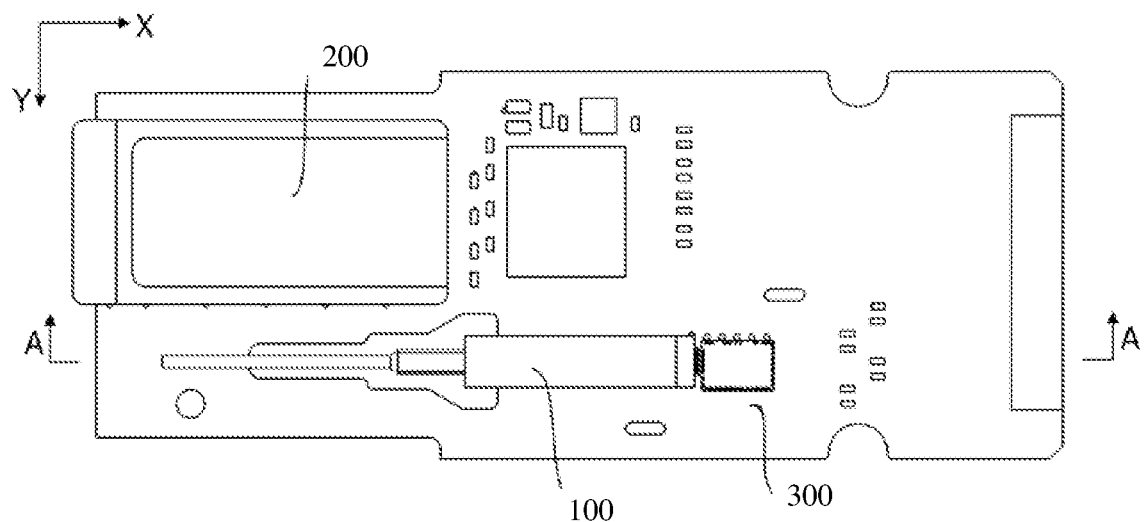
FIG. 1A is a schematic diagram illustrating a structure of a receiver and a transmitter in an optical module according to some approaches.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

In a structure of an optical module, to isolate a signal transmitted by a transmitter from a signal transmitted by a receiver, and decrease crosstalk interference between the two signals, the receiver and the transmitter are spaced from each other on a circuit board. Thus, a space between the receiver and the transmitter may be increased to decrease the crosstalk interference between receiving signal and transmitting signal.

In one embodiment, many components may be disposed on the transmitter, a driving chip may be disposed at the back of the transmitter and a width size of the circuit board may be limited. Therefore, the space along a width direction (as indicated by Y direction shown in FIG. 1A) between the transmitter and the receiver may be increased to a certain limit, and may not be increased further above the certain limit. Thus, the transmitter and the receiver may be spaced along a length direction (as indicated by X direction shown in FIG. 1A).

As shown in FIG. 1A, a receiver 100 is disposed along a side facing an electrical port of a circuit board 300, that is, the receiver is disposed away from a transmitter 200 along the X direction in FIG. 1A.

Figure 1B:
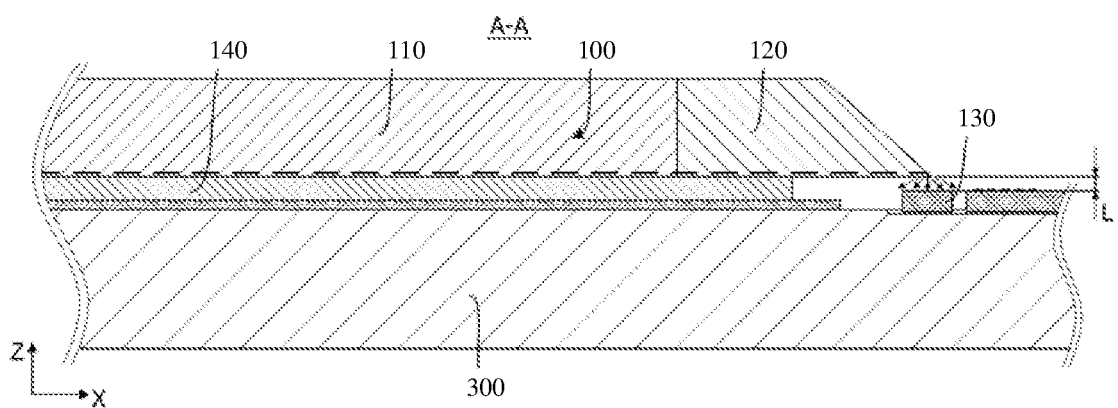
FIG. 1B is an enlarged view of a section of an optical module according to some approaches.

With reference to FIG. 1B, the receiver 100 may include a reflector 120 and an arrayed waveguide grating 110. The reflector 120 may be disposed at a rear end of the arrayed waveguide grating 110. An optical signal output by an optical fiber is emitted from the reflector 120 after passing through the arrayed waveguide grating 110, and is received by a Photo-Diode (PD) arrayed receiving chip 130. In this way, the receiver 100 receives the optical signal.

With reference to FIG. 1B, a cover plate 140 may be disposed at a bottom of the arrayed waveguide grating 110 for protecting the arrayed waveguide grating, and the arrayed waveguide grating 110 of the receiver 100 is located above the circuit board 300. As a result, the arrayed waveguide grating 110 may have a limited coupling space in a Z direction, and thus a bottom surface of the reflector has a certain distance (as indicated by a distance L in FIG. 1B) from the PD arrayed receiving chip. The distance (L) may not be further shortened, thereby affecting a coupling performance of the receiver. Also, when the arrayed waveguide grating is coupled toward a surface of the circuit board, due to a limited coupling space of the arrayed waveguide grating in the Z direction, it may be difficult to ensure a certain thickness of a filling compound between the circuit board and the arrayed waveguide grating, thereby decreasing fixing stability of the arrayed waveguide grating.

The present disclosure describes another embodiment of an optical module to improve the coupling performance of a receiver and/or to increase fixing stability of an arrayed waveguide grating. The optical module may include a groove in a circuit board. The groove may be disposed on a top surface of the circuit board, and a recessing direction of the groove is into the top surface of the circuit board and along with a height or thickness direction of the circuit board (a Z direction in FIG. 2A). The arrayed waveguide grating is disposed above the groove and opposite to the groove, and a cover plate for protecting the arrayed waveguide grating may be disposed inside the groove. The present disclosure may increase a space for receiving the arrayed waveguide grating on the circuit board, may increase a thickness of the filling compound between the circuit board and the arrayed waveguide grating and/or between the circuit board and the cover plate, and/or may improve a fixing stability of the arrayed waveguide grating. In one implementation, a width of the cover plate may be the same as a width of the arrayed waveguide grating. In another implementation, the width of the cover plate may be slightly smaller than the width of the arrayed waveguide grating. In another implementation, the width of the cover plate may be slightly larger than the width of the arrayed waveguide grating. Here, "width" may refer to a dimension along the Y direction in FIG. 2B, and "slightly" may refer to less than 1 mm.

Figure 2A:
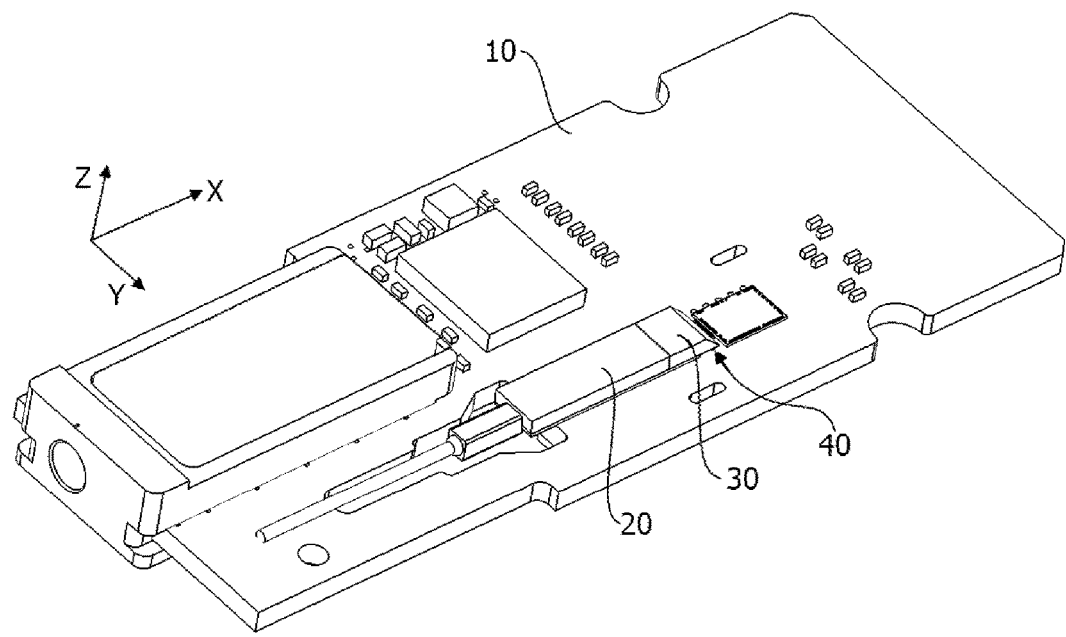
FIG. 2A is a schematic diagram illustrating a structure of an optical module according to some embodiments of the present disclosure.
Figure 2B:
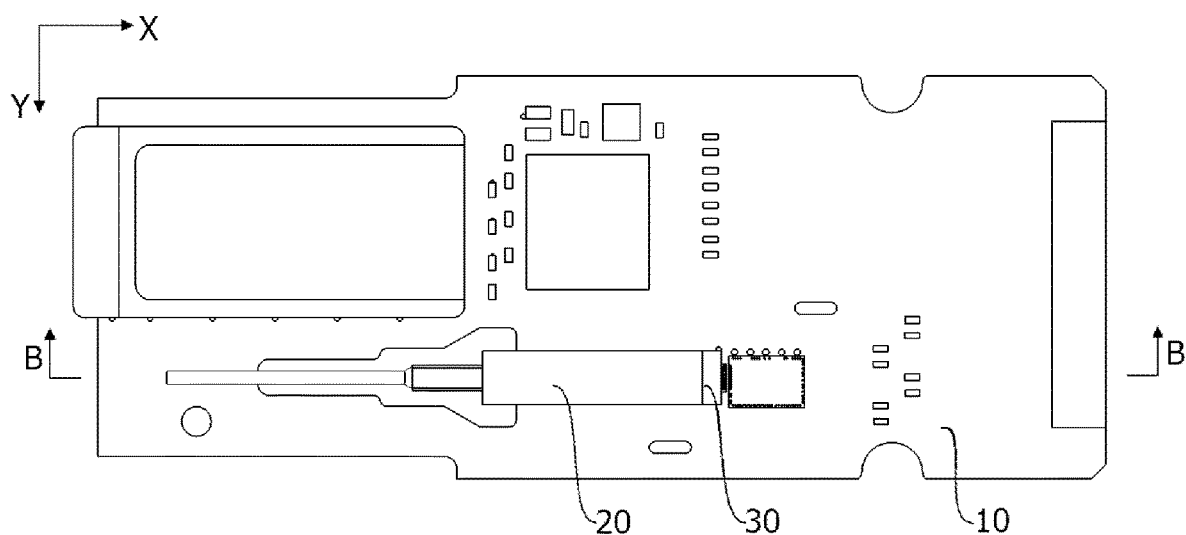
FIG. 2B is a top view of an optical module according to some embodiments of the present disclosure.

In one implementation, a width of the groove may be same or slightly larger than the width of the cover plate, so that the cover plate may fit inside the groove along the Y direction in FIG. 2B.

Figure 3:
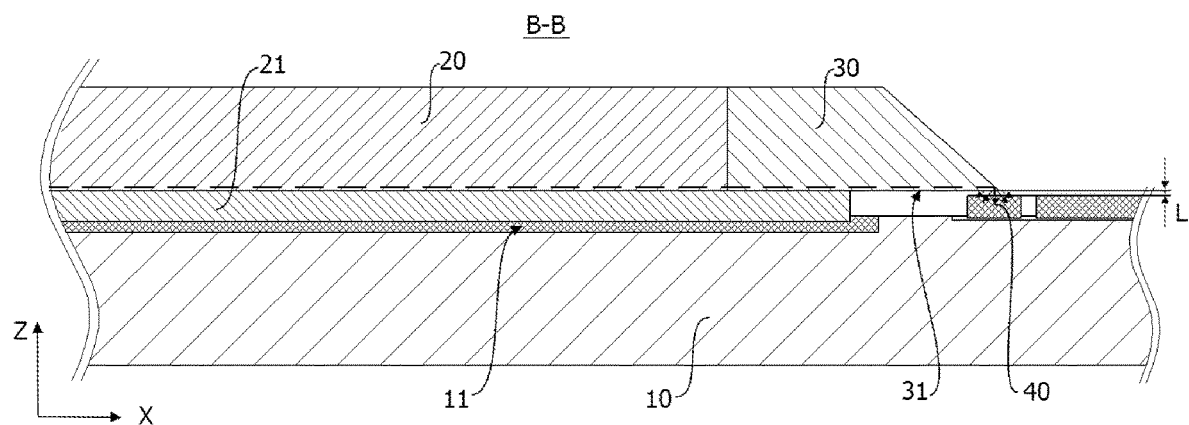
FIG. 3 is an enlarged view of a section of an optical module according to some embodiments of the present disclosure.

In another implementation, referring to FIG. 3, a depth of the groove may be same or smaller than a thickness of the cover plate, so that the arrayed waveguide grating may be above the surface of the circuit board. The gap between the arrayed waveguide grating and the surface of the circuit board may be changed by adjusting a thickness of a compound between the cover plate and the groove. Here, "thickness" and "depth" may refer to dimensions along a Z direction in FIG. 3.

The optical module may further include a reflector. The reflector may be disposed above the circuit board and opposite to the circuit board in a height direction of the circuit board. The reflector may be connected with the arrayed waveguide grating. The groove may be disposed in the circuit board, through which coupling spaces of the arrayed waveguide grating and the reflector in the height direction may be increased. The present disclosure may shorten a distance from a bottom surface of the reflector to the PD arrayed receiving chip, and thus may improve the coupling performance of the receiver.

An embodiment for an optical module may be described below with specific examples in combination with the accompanying drawings.

FIGS. 2A and 2B are schematic diagrams illustrating a structure of an optical module according to some embodiments of the present disclosure. The optical module according to some embodiments of the present disclosure may include a circuit board 10, an arrayed waveguide grating 20 a reflector 30 and a PD arrayed receiving chip 40 disposed on the circuit board 10. The receiver of the optical module may include the arrayed waveguide grating 20, the reflector 30 and the PD arrayed receiving chip 40. The receiver may receive an optical signal and convert the optical signal to an electrical signal.

The circuit board 10 may include a pad, a via hole, a mounting hole, a wire, a component and a connector, and ma serve as a support for the component in the optical module, that is, serving as a carrier for different circuit chips and signal lines or the like. In some embodiments of the present disclosure, the arrayed waveguide grating 20 and the reflector 30 may be disposed on the circuit board 10, so that the circuit board 10 carries and supports the arrayed waveguide grating 20 and the reflector 30. The PD arrayed receiving chip 40 may be electrically connected with the circuit board 10 to transmit the electrical signal.

In one implementation, as shown in FIGS. 2A, 2B, and 3, the arrayed waveguide grating 20 may be connected with the reflector 30. In another implementation, the arrayed waveguide grating 20 and the reflector 30 may be disposed integrally as one component. As a result, the arrayed waveguide grating 20 and the reflector 30 may be coupled to other component(s) such as the PD arrayed receiving chip 40 at the same time, to reduce a workload of an optical path coupling operation. The arrayed waveguide grating 20 and the reflector 30 may be disposed along a length direction (as indicated by the X direction in FIG. 3) of the circuit board 10. The arrayed waveguide grating 20 and the reflector 30 may be disposed opposite to the circuit board along the height/thickness direction (as indicated by the Z direction in FIG. 3) of the circuit board 10. A bottom surface 31 of the reflector 30 and the PD arrayed receiving chip 40 may be oppositely disposed in the height direction of the circuit board 10. The arrayed waveguide grating 20 may be connected with an optical fiber to receive the optical signal. The received optical signal may be redirected in transmission path after being reflected by an end surface of the reflector 30 and emitted from the bottom surface 31 of the reflector 30. The emitted optical signal may be received and be converted to the electrical signal by the PD arrayed receiving chip 40.

In the present disclosure, the "X direction", the "Y direction", and the "Z direction" do not refer to a positive direction or a negative direction. In other words, the "X direction" may refer to a direction parallel to X axis, which is the same or opposite to the arrow pointing of the X axis. The "Y direction" may refer to a direction parallel to Y axis, which is the same or opposite to the arrow pointing of the Y axis. The "Z-direction" may refer to a direction parallel to Z-axis, which is the same or opposite to the arrow pointing of the Z-axis.

During a process of the receiver receiving the optical signal, the distance L between the bottom surface 31 of the reflector 30 and a surface of the PD arrayed receiving chip 40 in the height direction of the circuit board 10 may directly affect a reception performance of the optical signal. When the distance L is larger, the reception performance of the optical signal may be worse. When the distance L is smaller, the reception performance of the optical signal may be better. The reason may be that, when light is transmitted in the reflector 30, the light is reflected by an oblique end surface of the reflector 30 and then emitted through the bottom surface 31 towards an air layer, during where the transmission medium for the light changes and the light is emitted at an outwardly-diffusing angle through the bottom surface 31.

Therefore, if the L is excessively large, less light may be received by the PD arrayed receiving chip 40 and the reception performance of the optical signal may be decreased. Therefore, for an optical module in which the arrayed waveguide grating 20 and the reflector 30 in the receiver are located above the circuit board and connected with the circuit board, the transmission performance of the receiver of the optical module may be effectively improved by shortening the distance, i.e., reducing the L value, between the bottom surface 31 of the reflector 30 and the PD arrayed receiving chip 40. Note that the bottom surface 31 of the reflector 30 refers to a surface which is on the reflector 30 and opposite to the circuit board 10. As a result, the light reflected by the reflector 30 may be emitted from the bottom surface 31.

Figure 4:
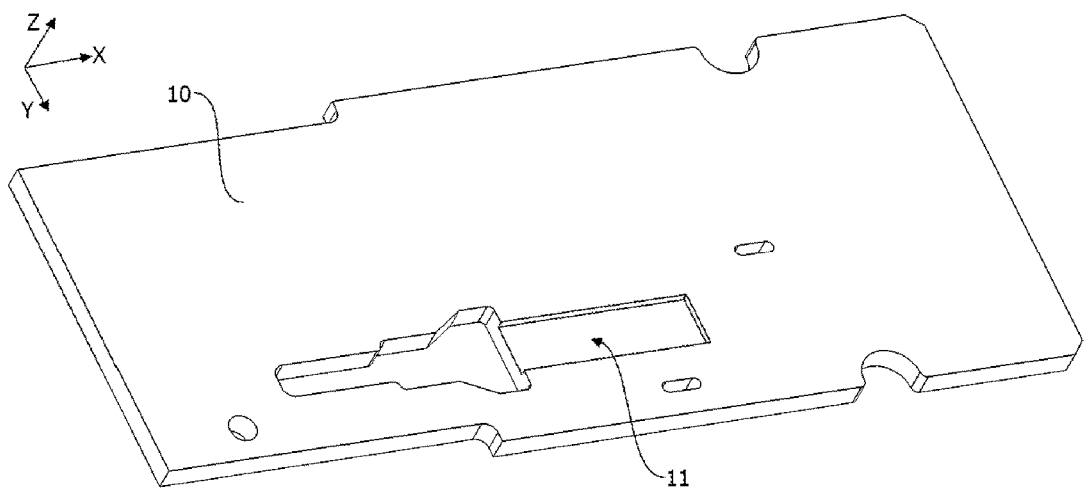
FIG. 4 is a schematic diagram illustrating a structure of a circuit board in an optical module according to some embodiments of the present disclosure.

In FIG. 4, a groove 11 may be disposed on a surface of the circuit board 10. The groove 11 may be recessed towards the circuit board 10 in the height direction of the circuit board 10. The groove 11 and the arrayed waveguide grating 20 may be oppositely disposed in the height direction of the circuit board 10. The arrayed waveguide grating 20 may be fixed into the groove 11. The groove 11 may provide a coupling space for the arrayed waveguide grating 20 in the height direction of the circuit board 10.

Referring to FIG. 3, a reflector 30 may be connected with the arrayed waveguide grating 20. As a result, the arrayed waveguide grating 20 may move toward the surface of the circuit board 10 to shorten the distance L between the bottom surface 31 of the reflector 30 and the PD arrayed receiving chip 40.

When the arrayed waveguide grating 20 and the reflector 30 are moved toward the circuit board 10 to improve the coupling performance of the reflector 30 and the PD arrayed receiving chip 40, a motion interference with the circuit board 10 may occur and even a scratch to the surface of the circuit board may happen. In one implementation, the optical module may include a cover plate to protect a waveguide structure in the arrayed waveguide grating 20 and to avoid any scratch with another component such as the circuit board during a coupling process of the arrayed waveguide grating 20.

Figure 5:
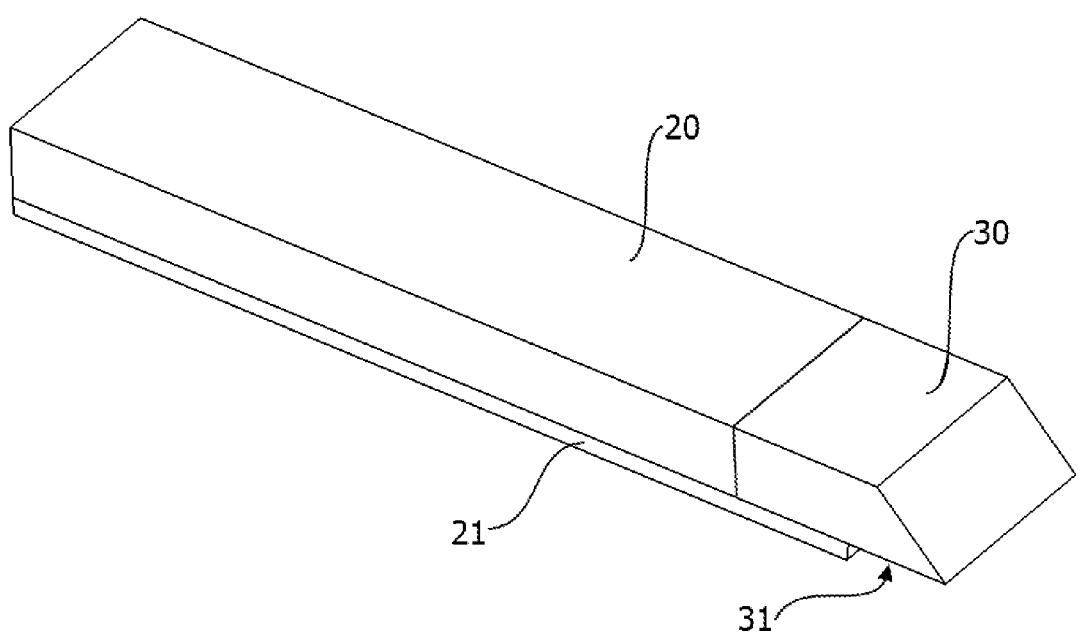
FIG. 5 is a schematic diagram illustrating a structure of an arrayed waveguide grating and a reflector in an optical module according to some embodiments of the present disclosure.

As shown in FIGS. 3 and 5, a cover plate 21 may be at the bottom surface of the arrayed waveguide grating 20, which may be a surface that is on the arrayed waveguide grating and faces the circuit board 10. The cover plate 21 may provide security protection for the arrayed waveguide grating 20. The cover plate may be made from any suitable materials, for example but not limited to, fiberglass, plastic, aluminum, and alloy.

In one implementation, the cover plate 21 may be disposed in the groove 11. In another implementation, the cover plate 21 may be fixed in the groove 11 so as to fix the arrayed waveguide grating 20 on the circuit board 10.

In another embodiment, optionally, to protect the arrayed waveguide grating 20 and the reflector 30 against external scratches and impacts, a protective shell (not shown) may be disposed above the arrayed waveguide grating 20 and/or the reflector 30. The protective shell may be made from the same or different materials as the cover plate.

To fix the arrayed waveguide grating 20 on the circuit board 10, a compound may be provided in the groove 11 to fixedly connect the arrayed waveguide grating 20 with the circuit board 10. The compound may be an adhesive material to glue the arrayed waveguide grating 20 with the circuit board 10 together.

Optionally when the optical module includes the cover plate 21, the cover plate 21 at the bottom surface of the arrayed waveguide grating 20 may be fixedly connected with the groove 11 through the compound. In some embodiments of the present disclosure, the disposed groove 11 has the following benefits for fixing the arrayed waveguide grating 20 on the circuit board 10.

1. The groove 11 on the surface of the circuit board 10 may increase a filling space for the compound between the arrayed waveguide grating 20 and the circuit board 10, thus increasing a height or thickness of the compound. Therefore, the disposal of the groove 11 not only may increase the filling space for the compound to help the stability of the arrayed waveguide grating 20 on the circuit board 10, but also may ensure a proper L value to satisfy the transmission performance of the receiver.

2. The filling space of the compound may be limited or confined by the groove 11. In other words, the compound for fixing the arrayed waveguide grating 20 may be limited or confined within the groove 11, so as to prevent the compound from flowing arbitrarily onto the circuit board 10. Without a proper limitation and confinement of the compound by the groove, there might not be guarantee that dosed compound had good fixing performance for the arrayed waveguide grating. Without the proper limitation and confinement of the compound by the groove, it might also be possible that the compound flows arbitrarily to induce damage to other electronic component(s) on the circuit board 10, thus affecting the working performance of the electronic component(s).

Therefore, while maintaining the size of the filling space of the compound, the groove 11 may limit and confine a flow region in which the compound flows, thus improving fixing and coupling performances.

The present disclosure describes embodiments for an optical module. In the optical module, the receiver and the transmitter may be disposed staggerdly on the circuit board along the length direction of the circuit board. The spacing of the transmitter and the receiver may be increased to decrease the crosstalk interference of signals transmitted by the transmitter and the receiver.

The present disclosure describes embodiments for an optical module including a groove. The groove 11 may be disposed on the surface of the circuit board to shorten/reduce the distance (i.e., the L value) between the bottom surface 31 of the reflector 30 and the PD arrayed receiving chip 40, thereby effectively improving the transmission performance of the receiver of the optical module. Further, the disposal of the groove 11 may provide the filling space for the compound and limit/confine the movement space for the applied compound on the circuit board 10. When the filling space of the compound is increased, the groove 11 limits the displacement space for the compound and thus limits the fixing region for the compound, thereby effectively improving stability of the arrayed waveguide grating 20 on the circuit board 10. Thus, the present disclosure at least addresses one or more existing problems. For one existing problem, the arrayed waveguide grating 20 and the reflector 30 are both disposed in the optical module. As a result, the displacement distance of the arrayed waveguide grating 20 and the reflector 30 in the height direction is limited due to the disposal of the circuit board under them, so that the distance between the bottom surface of the reflector 30 and the PD arrayed receiving chip 40 cannot be shortened, and the transmission performance of the receiver cannot be decreased. For another existing problem, a small fixing space between the arrayed waveguide grating 20 and the circuit board is not helpful to stably fix the arrayed waveguide grating 20 on the circuit board 10.

In conclusion, the optical module according to the present disclosure may include the circuit board, the arrayed waveguide grating, the reflector and the PD arrayed receiving chip disposed on the circuit board. The arrayed waveguide grating may be connected with the reflector, and the PD arrayed receiving chip may be electrically connected with the circuit board. The PD arrayed receiving chip may be configured for receiving light that is transmitted by the arrayed waveguide grating and emitted from the reflector. The arrayed waveguide grating and the reflector may be disposed opposite to the circuit board in the height direction of the circuit board. The groove may be disposed in the circuit board, and the groove may be recessed in the height direction of the circuit board. The arrayed waveguide grating and the groove may be oppositely disposed in the height direction of the circuit board, and the arrayed waveguide grating may be fixed into the groove. Thus, the disposal of the groove in the circuit board may increase the coupling space of the arrayed waveguide grating and the reflector in the height direction, so that the distance from the bottom surface of the reflector to the PD arrayed receiving chip is shortened, and the coupling performance of the receiver is improved. Also, the disposed groove may increase the space for fixing the arrayed waveguide grating on the circuit board, so that the stability of the arrayed waveguide grating is improved.

In the description of the present disclosure, terms "a first" and "a second" are used only for descriptions and shall not be understood as indicating or implying relative importance or implying a number of the indicated technical features. Thus, elements limited by "a first" and "a second" may explicitly or implicitly include one or more features. In the descriptions of the present disclosure, "a plurality" refers to two or more unless otherwise stated clearly.

In the descriptions of the present specification, terms such as "an embodiment", "some embodiments", "embodiments", "illustrative examples", "an example" or "some examples" are intended to refer to that a specific feature, structure, material, or characteristic described in combination with an embodiment or an example are included in at least one embodiment or example of the present disclosure. In the present specification, the illustrative expressions of the above terms do not necessarily refer to a same embodiment or example. Further, specific feature, structure, material or characteristic described above may be combined in a proper way in one or more embodiments or examples.

The foregoing disclosure is merely illustrative of some examples of the present disclosure but not intended to limit the present disclosure, and any modifications, equivalent substitutions, adaptations thereof made within the spirit and principles of the disclosure shall fall within the scope of the present disclosure.

The invention claimed is:

1. An optical module, comprising:
a circuit board comprising a groove disposed in a surface of the circuit board, wherein the groove is recessive along a height direction of the circuit board; and
a receiver comprising:
an arrayed waveguide grating on the circuit board;
a reflector in connection with the arrayed waveguide grating and on the circuit board; and
a Photo-Diode (PD) arrayed receiver chip on the circuit board, wherein the PD arrayed receiver chip electrically in connection with the circuit board, and is opposite to a part of a bottom surface of the reflector in the height direction of the circuit board;
wherein the arrayed waveguide grating is configured to receive an optical signal from an optical fiber, and the arrayed waveguide grating is arranged right above the groove and fixed in the groove, or arranged within the groove, such that a distance between the bottom surface of the reflector and the PD arrayed receiver chip is shortened.

2. The optical module according to claim 1, further comprising a cover plate on a surface of the arrayed waveguide grating facing the surface of the circuit board, wherein the groove is configured to receive the cover plate.

3. The optical module according to claim 2, wherein a width of the groove is same as a width of the cover plate.

4. The optical module according to claim 2, wherein a width of the groove is slightly larger than a width of the cover plate.

5. The optical module according to claim 2, further comprising a first compound, wherein the cover plate is fixed in the groove by the first compound.

6. The optical module according to claim 5, further comprising a second compound, wherein the cover plate is fixed to the arrayed waveguide grating by the second compound.

7. The optical module according to claim 2, wherein a width of the cover plate is same as a width of the arrayed waveguide grating.

8. The optical module according to claim 2, wherein a width of the cover plate is slightly smaller than a width of the arrayed waveguide grating.

9. The optical module according to claim 2, wherein a width of the cover plate is slightly larger than a width of the arrayed waveguide grating.

10. The optical module according to claim 2, wherein a depth of the groove is same as a thickness of the cover plate.

11. The optical module according to claim 2, wherein a depth of the groove is smaller than a thickness of the cover plate.

12. The optical module according to claim 1, wherein the reflector is configured to receive the optical signal from the arrayed waveguide grating and reflect the optical signal towards the bottom surface of the reflector.

13. The optical module according to claim 1, wherein the PD arrayed receiver chip is configured to receive the optical signal from the reflector and generate electrical signal according to the optical signal.

14. The optical module according to claim 1, further comprising a protective shell above the arrayed waveguide grating and the reflector.

15. The optical module according to claim 1, further comprising a compound, wherein the arrayed waveguide grating is fixed in the groove by the compound.

16. The optical module according to claim 1, wherein:
the receiver further comprises reflector disposed above the circuit board and opposite to
the circuit board along the height direction of the circuit board; and
the reflector is configured to connect with the arrayed waveguide grating.

17. The optical module according to claim 16, wherein the reflector is configured to receive the optical signal from the arrayed waveguide grating and reflect the optical signal towards a bottom surface of the reflector.

18. The optical module according to claim 16, further comprising a protective shell above the arrayed waveguide grating and the reflector.

\* \* \* \* \*